Oct. 3, 1933.  W. G. ROLKERR  1,929,005
PARACHUTE SAFETY DEVICE
Filed Oct. 20, 1930
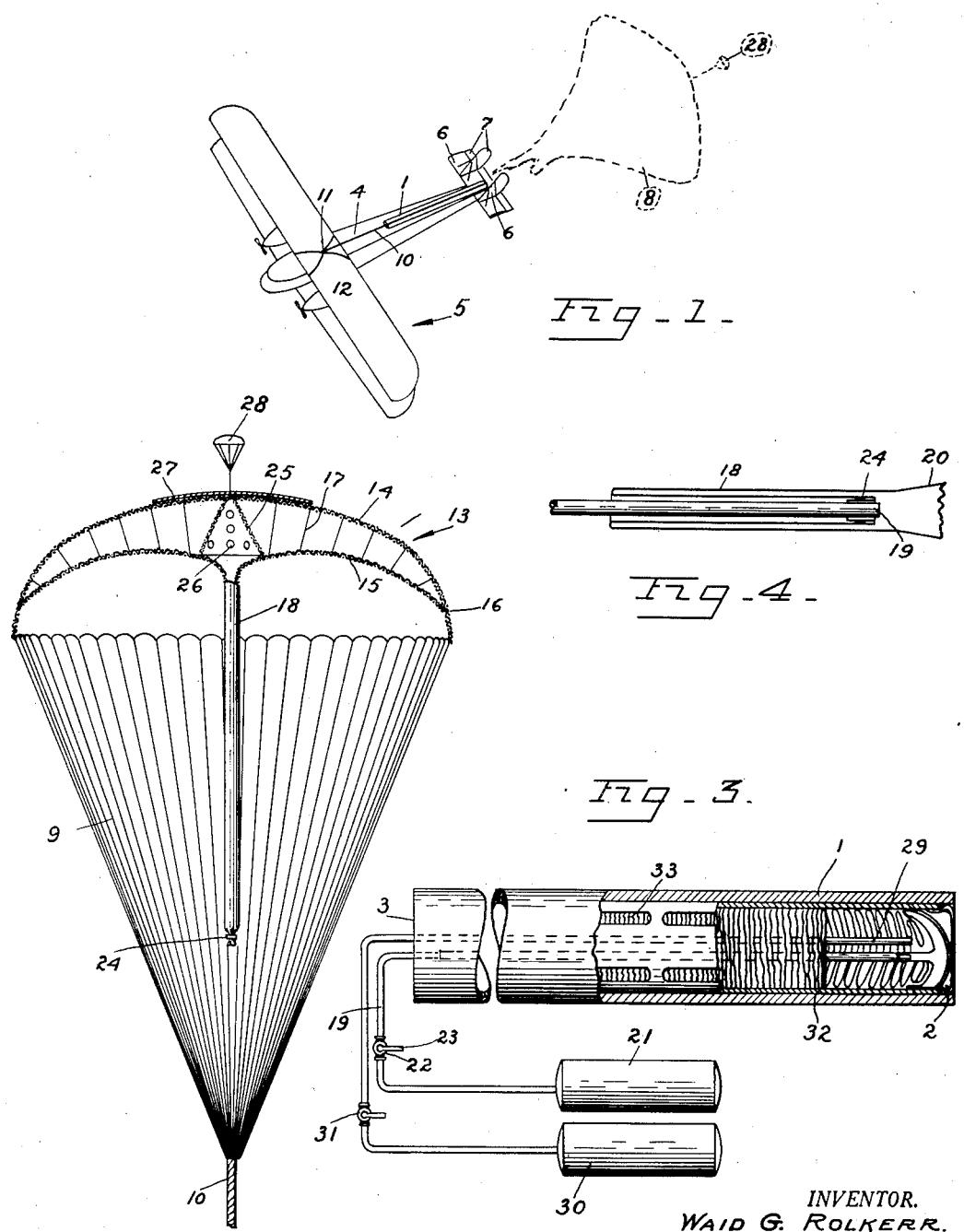
INVENTOR.
WAID G. ROLKERR.
BY Munn + Co.
ATTORNEYS.

Patented Oct. 3, 1933

1,929,005

UNITED STATES PATENT OFFICE 1,929,005

PARACHUTE SAFETY DEVICE

Waid G. Rolkerr, Oakland, Calif.

Application October 20, 1930. Serial No. 490,002

8 Claims. (Cl. 244—21)

My invention relates to improvements in parachute safety devices, and it consists in the combinations, constructions and arrangements hereinafter described.

An object of my invention is to provide a parachute safety device which makes use of fluid means, such as air, for positively ejecting the parachute from its container, and which further makes use of a second fluid means such as gas for inflating the two walls of the parachute, thus causing it to positively open because of this fluid pressure, the gas also aiding in making the parachute buoyant.

The container housing the chute is disposed at a portion of the airplane preferably at the rear of the fuselage with its open end terminating at the rear edges of the rigid portions of the elevators and rudders so that the forcing of the chute from the container will instantly free it from all obstructions on the airplane. In the present form of the invention I have shown the parachute as being large enough to support an airplane, and it should also be kept in mind that the parachute is adapted for individual use.

Other objects and advantages will appear as the specification proceeds, and the novel features of the device will be particularly pointed out in the claims hereto annexed.

My invention is illustrated in the accompanying drawing, in which:

Figure 1 is a perspective view of an airplane showing my device operatively applied thereto, Figure 2 is a vertical section through the parachute shown in open position, Figure 3 is a schematic view partly in section of the device, and Figure 4 is a second schematic view of a part of the device.

In carrying out my invention I provide a tubular container 1 having an open end 2 and a closed end 3 (see Figure 3). The container in the form of the device illustrated in Figure 1 is secured to the top rear portion of a fuselage 4 of an airplane indicated generally at 5. The open end of the container 1 is disposed adjacent to the rear edges of the rigid portions 6 of the elevators and rudders 7. A parachute indicated generally at 8 and described in detail hereinafter is placed within the container 1 and has its shroud lines 9 connected to a rope 10 which extends along the outside of the container 1 as shown in Figure 1 and has its other end connected at 11 to the center of the airplane 5 by means of supporting strands 12 or other suitable supporting means.

I will now describe the construction of the parachute 8. The umbrella portion 13 of the parachute is in the form of an envelope and has an outer wall 14 of fabric and an inner wall 15 of fabric. The marginal edges of the outer end of the inner walls 14 and 15 are secured together as at 16 for forming a fluid-tight seal. Elastic strands 17 connect the walls 14 and 15 and permit the collapsing of the walls in order to aid in the folding of the parachute but prevent the walls from moving away from each other beyond predetermined limits. In this way the shape of the umbrella portion 13 is maintained even when inflated with a lifting gas such as hydrogen or the like.

The walls 14 and 15 are preferably made of cloth which is leak-proof, and the lower wall 15 has its central portion formed into a flexible tube 18 through which the gas is forced. In assembling the parachute within the container 1, the flexible tube 18 has its open end removably secured to a tube 19 preferably made of metal. The flexible tube then extends the length of the portion of the tube 19 that is housed within the container 1, and then the tube 18 is folded back upon itself so as to again extend over the same length of the portion of the tube 19. The tube 18 is then enlarged as at 20 (see Figure 4) and forms the lower wall 15.

The tube 19 extends through the closed end 3 of the container 1 and communicates with a lifting gas disposed in a gas tank 21. A valve 22 disposed in the pipe 19 normally keeps the gas within the tank 21. However, when the parachute is to be used, the pilot opens the valve 22 either by means of a handle 23 or a remote control (not shown), and the gas in the tank 21 will instantly pass into the envelope formed by the walls 14 and 15 and will cause this to positively open. The opening of the envelope takes place after the parachute has left the container 1, and I will describe hereinafter the positive means for causing the parachute to be forced from the container 1.

As the umbrella portion 13 together with the tube 18 move away from the tube 19, the tube 18 will slide off from the tube 19. A rubber band 24 or other suitable means is disposed around the free end of the tube 18, and this band immediately closes the open end of the tube when the latter leaves the tube 19. In this way the gas is trapped in the envelope 13 and the tube 18.

The gas has considerable pressure, and therefore enters the envelope 13 with considerable force. In order to prevent the gas from rupturing the wall 14, I provide a conical-shaped flexible member 25 (see Figure 2) that has its apex disposed at the center of the wall 14 and its base connected to the wall 15. This conical-shaped member acts as a buffer for the gas as it flows into the envelope 13 from the tube 18 and it has openings 26 therein for directing the gas laterally into the envelope. Since the cone 25 is flexible, it will not interfere with the packing of the parachute. If desired, a reinforcing piece 27 may be secured to the outer wall 14, and a pilot chute 28 is secured to the center of the reinforcing piece 27.

I will now describe the means for positively ejecting the parachute from the container 1. The container 1 carries a second pipe 29 which is preferably connected to a tank 30 containing compressed air or other fluid. A valve 31 when opened permits the compressed air in the tank 30 to issue from the open end of the pipe 29. In packing the parachute, it is disposed around the pipes 19 and 29 so that the closed end of the umbrella portion 13 is disposed at the open end of the pipe 29. The valve 31 is opened at the same time as the valve 22, and the compressed air will flow into the interior of the parachute and will positively eject it from the container 1 with sufficient force and direction to clear it from any obstructions on the airplane. It is obvious that the valve 31 may be remotely controlled if desired.

In order to aid in the packing of the parachute within the container 1, I provide a paper bag 32 (see Figure 3) which is preferably perforated as at 33. This bag is in reality a piece of paper having a width equal to the length of the container 1, this paper being wrapped around the parachute when in folded position and having a folded end which will permit the paper to be inserted into the container 1 like a cartridge and to carry the parachute therewith. The pilot chute 28 is disposed at the outside of the paper bag and at the open end 2 of the container 1. The cable 10 connected to the parachute extends from the inner closed end 3 of the container 1 along the inner wall of the container to the open end 2 and then along the outside of the container as shown in Figure 1 to the place where it is connected to the supporting means 12.

From the foregoing description of the various parts of the device, the operation thereof may be readily understood.

The parachute remains within the container until needed, and is ready for instant use upon the opening of the valves 22 and 31. These valves are opened simultaneously, and the gas is filling the envelope 13 at the same time that the compressed air is forcing the chute from the container 1 with sufficient force and direction to clear it from any obstructions on the airplane. All of the gas has entered the envelope 14 before the tube 18 becomes disconnected from the tube 19. The tube 18 is then automatically sealed by the restricting member 24 and the gas is confined within the envelope 13. The paper 32 is loosely wrapped around the parachute and will instantly fall away from the chute after the latter has been freed from the container 1. The shroud lines and the cable 10 are pulled from the container 1 after the umbrella-shaped portion 13 leaves the container. The gas within the envelope positively opens it, and its buoyant quality will aid in directing the parachute upwardly so as to immediately become effective in supporting the load of the airplane.

As already stated, the device may be used for pilots, and in this case the tanks 21 and 30 are smaller and may be strapped to the pilot. A common control may be connected to both valves 22 and 31 so that the pilot can open both with one movement of the hand. This will permit quick action, which is a vital necessity when using the parachute. It is obvious that compressed air or gas may be used for both the ejecting of the parachute and the inflating of the envelope 13. The flexible strands 17 prevent the gas within the envelope 13 from forcing the walls 14 and 15 out of shape. It should be noted that the pipes 19 and 29 direct the gas and air to specific parts of the parachute in order to aid in the quick expelling and opening of the chute.

Although I have shown and described one embodiment of my invention, it is to be understood that the same is susceptible of various changes, and I reserve the right to employ such changes as may come within the scope of the claims hereto annexed.

I claim:

1. In combination, a parachute having an inflatable umbrella-shaped portion with a flexible tubing leading thereto, a pipe for conveying a fluid to the umbrella-shaped portion, said flexible tubing being removably secured to the pipe, and means for closing the end of the flexible tubing when the tubing is pulled free of the pipe.

2. In combination, a parachute container having an open end, a gas conveying pipe and a compressed air conveying pipe terminating within the container, a parachute disposed within the container and around the pipes and having an inflatable portion in communication with the gas pipe by a tube enclosing the pipe, manually controlled means for directing gas and air under pressure to their respective pipes for ejecting the parachute from the container and for inflating the parachute, and means for automatically closing the end of the tube when it is removed from the gas pipe.

3. In combination, a parachute container having an open end, a gas conveying pipe and a compressed air conveying pipe terminating within the container, a parachute disposed within the container and around the pipes and having an inflatable portion in communication with the gas pipe by a tube enclosing the pipe, manually controlled means for directing gas and air under pressure to their respective pipes for ejecting the parachute from the container and for inflating the parachute, means for automatically closing the end of the tube when it is removed from the gas pipe, and a paper disposed around the parachute and within the container for aiding in packing the parachute in the container, said paper dropping off from the parachute as the latter is ejected from the container.

4. A parachute having an inflatable umbrella-shaped portion with a fluid inlet tube leading thereto, said umbrella-shaped portion comprising two walls having the circumferences secured together, and a flexible cone-shaped baffle disposed at the outlet end of the tube, said cone having openings in its wall for directing a gas laterally into the inflatable portion.

5. A parachute having an inflatable umbrella-shaped portion with a fluid inlet tube leading thereto, said umbrella-shaped portion comprising two walls having the circumferences secured together, a flexible cone-shaped baffle disposed at the outlet end of the tube, said cone having openings in its wall for directing a gas laterally into the inflatable portion, and flexible strands disposed between the two walls for limiting the movement of the two walls away from each other.

6. In a parachute safety device, a tubular member for conveying a fluid, a flexible tube communicating with a compartment in a parachute and having its free end removably secured to the tube, the means used for connecting the two tubes together also closing the flexible tube when the tubes are disconnected.

7. A parachute safety device comprising a container having an open end, a parachute having a fluid receiving compartment and being folded into a compact bundle and wrapped in paper and inserted into the container, an air conveying pipe extending into the container and having its open end terminating near the top of the folded parachute, the parachute surrounding the pipe, and a gas conveying pipe communicating with the parachute compartment.

8. A parachute safety device comprising a container having an open end, a parachute having a fluid receiving compartment and being folded into a compact bundle and wrapped in paper and inserted into the container, an air conveying pipe extending into the container and having its open end terminating near the top of the folded parachute, the parachute surrounding the pipe, and a gas conveying pipe communicating with the parachute compartment, means for delivering air and gas under pressure to said pipes for expelling the parachute from the container, and for inflating the compartment.

WAID G. ROLKERR.